(12) United States Patent
Hashimoto et al.

(10) Patent No.: US 10,146,261 B2
(45) Date of Patent: Dec. 4, 2018

(54) WEARABLE APPARATUS HAVING A FLEXIBLE ELECTROPHORETIC DISPLAY

(71) Applicant: E Ink Corporation, Billerica, MA (US)

(72) Inventors: Keisuke Hashimoto, Tokyo (JP); Kenji Nakazawa, Tokyo (JP)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/667,790

(22) Filed: Aug. 3, 2017

(65) Prior Publication Data

US 2018/0039303 A1  Feb. 8, 2018

Related U.S. Application Data

(60) Provisional application No. 62/371,942, filed on Aug. 8, 2016.

(51) Int. Cl.
| | | |
|---|---|---|
| *G06F 1/16* | (2006.01) | |
| *G02F 1/167* | (2006.01) | |
| *G06F 3/01* | (2006.01) | |
| *G06F 3/041* | (2006.01) | |
| *G06F 3/042* | (2006.01) | |
| *B29C 47/64* | (2006.01) | |
| *B29C 47/02* | (2006.01) | |

(52) U.S. Cl.
CPC ............ *G06F 1/1652* (2013.01); *B29C 47/64* (2013.01); *G02F 1/167* (2013.01); *G06F 1/163* (2013.01); *G06F 3/016* (2013.01); *G06F 3/042* (2013.01); *G06F 3/0412* (2013.01); *B29C 47/025* (2013.01)

(58) Field of Classification Search
CPC ...................................................... G06F 1/163

USPC .................................................... 361/679.03
See application file for complete search history.

(56) References Cited

U.S. PATENT DOCUMENTS

| | | | |
|---|---|---|---|
| 4,418,346 A | 11/1983 | Batchelder | |
| 5,760,761 A | 6/1998 | Sheridon | |
| 5,777,782 A | 7/1998 | Sheridon | |
| 5,808,783 A | 9/1998 | Crowley | |
| 5,857,217 A * | 1/1999 | Hsueh | A44C 5/0007 2/170 |
| 5,872,552 A | 2/1999 | Gordon, II | |
| 6,054,071 A | 4/2000 | Mikkelsen, Jr. | |
| 6,055,091 A | 4/2000 | Sheridon | |
| 6,097,531 A | 8/2000 | Sheridon | |
| 6,128,124 A | 10/2000 | Silverman | |
| 6,130,774 A | 10/2000 | Albert | |
| 6,137,467 A | 10/2000 | Sheridon | |
| 6,144,361 A | 11/2000 | Gordon, II | |
| 6,147,791 A | 11/2000 | Sheridon | |

(Continued)

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

(Continued)

*Primary Examiner* — Adrian S Wilson
(74) *Attorney, Agent, or Firm* — Brian D. Bean (57) ABSTRACT

A flexible, wearable apparatus comprising a flexible display, a support member and a retainer. In some embodiments, the flexible, wearable apparatus can be used in a flat or rounded configuration. In some embodiments, the flexible support member is formed to provide a substantially planar viewing surface for the electrophoretic display when the flexible, wearable apparatus is in a rounded state.

20 Claims, 9 Drawing Sheets

(56) References Cited

U.S. PATENT DOCUMENTS

| | | | |
|---|---|---|---|
| 6,172,798 B1 | 1/2001 | Albert | |
| 6,184,856 B1 | 2/2001 | Gordon, II | |
| 6,225,971 B1 | 5/2001 | Gordon, II | |
| 6,241,921 B1 | 6/2001 | Jacobson | |
| 6,271,823 B1 | 8/2001 | Gordon, II | |
| 6,301,038 B1 | 10/2001 | Fitzmaurice | |
| 6,577,496 B1* | 6/2003 | Gioscia | G06F 1/1616 345/156 |
| 6,621,766 B2* | 9/2003 | Brewer | G02B 26/026 368/10 |
| 6,672,921 B1 | 1/2004 | Liang | |
| 6,704,133 B2 | 3/2004 | Gates | |
| 6,788,449 B2 | 9/2004 | Liang | |
| 6,866,760 B2 | 3/2005 | Paolini, Jr. | |
| 6,870,657 B1 | 3/2005 | Fitzmaurice | |
| 6,922,276 B2 | 7/2005 | Zhang et al. | |
| 6,950,220 B2 | 9/2005 | Abramson et al. | |
| 6,982,178 B2 | 1/2006 | LeCain et al. | |
| 7,002,728 B2 | 2/2006 | Pullen et al. | |
| 7,012,600 B2 | 3/2006 | Zehner | |
| 7,075,502 B1 | 7/2006 | Drzaic | |
| 7,116,318 B2 | 10/2006 | Amundson et al. | |
| 7,170,670 B2 | 1/2007 | Webber | |
| 7,236,291 B2 | 6/2007 | Kaga et al. | |
| 7,312,784 B2 | 12/2007 | Baucom et al. | |
| 7,321,459 B2 | 1/2008 | Masuda et al. | |
| 7,347,019 B1 | 3/2008 | Shaw | |
| 7,411,719 B2 | 8/2008 | Paolini, Jr. et al. | |
| 7,420,549 B2 | 9/2008 | Jacobson | |
| 7,453,445 B2 | 11/2008 | Amundson | |
| 7,535,624 B2 | 5/2009 | Amundson et al. | |
| 7,679,814 B2 | 3/2010 | Paolini, Jr. et al. | |
| 7,839,564 B2 | 11/2010 | Whitesides et al. | |
| 8,009,348 B2 | 8/2011 | Zehner | |
| 8,319,759 B2 | 11/2012 | Jacobson | |
| 8,506,158 B2 | 8/2013 | Keung et al. | |
| 8,970,455 B2* | 3/2015 | Thorson | G06F 3/147 345/105 |
| 9,119,458 B2 | 9/2015 | Ward | |
| 9,176,530 B2 | 11/2015 | Rothkopf et al. | |
| 9,295,168 B2 | 3/2016 | Baek et al. | |
| 9,436,056 B2 | 9/2016 | Paolini, Jr. | |
| 2003/0026171 A1* | 2/2003 | Brewer | G02B 26/026 368/82 |
| 2003/0155389 A1* | 8/2003 | Swartzentruber | A44C 5/0053 224/164 |
| 2004/0156270 A1* | 8/2004 | Weng | G04C 19/00 368/82 |
| 2006/0209218 A1* | 9/2006 | Lee | G04G 9/00 349/1 |
| 2006/0273304 A1* | 12/2006 | Cok | H01L 51/0096 257/40 |
| 2011/0261002 A1* | 10/2011 | Verthein | G06F 1/181 345/174 |
| 2012/0002360 A1* | 1/2012 | Seo | G06F 1/1616 361/679.01 |
| 2012/0314546 A1* | 12/2012 | Brewer | G04G 17/04 368/281 |
| 2013/0044215 A1* | 2/2013 | Rothkopf | G06F 1/163 348/143 |
| 2013/0235008 A1* | 9/2013 | Kwon | G09G 3/20 345/204 |
| 2014/0160078 A1* | 6/2014 | Seo | G06F 3/017 345/175 |
| 2018/0095502 A1 | 4/2018 | Yamazaki et al. | |

OTHER PUBLICATIONS

Wood, D., "An Electrochromic Renaissance?" Information Display, 18(3), 24 (Mar. 2002).

Bach, U. et al., "Nanomaterials-Based Electrochromics for Paper-Quality Displays", Adv. Mater, vol. 14, No. 11, pp. 845-848 (Jun. 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Korean Intellectual Property Office, PCT/US2017/045226, International Search Report and Written Opinion, dated Nov. 8, 2017.

* cited by examiner

WEARABLE APPARATUS HAVING A FLEXIBLE ELECTROPHORETIC DISPLAY

RELATED APPLICATIONS

This application claims priority to U.S. Provisional Patent Application No. 62/371,942, filed Aug. 8, 2016, which is incorporated herein by reference in its entirety.

BACKGROUND OF INVENTION

This invention relates to flexible, wearable devices that include an electrophoretic display. The display can be used to display information, such as the time, to display a design or a logo, or in some embodiments, a user can interact with the device to send a message, control music, or check the weather, etc.

Figure 1A:
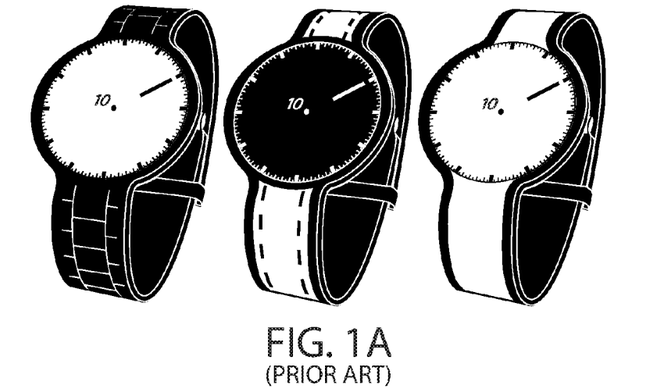
FIG. 1A shows a prior art wearable incorporating an electrophoretic display.
Figure 1B:
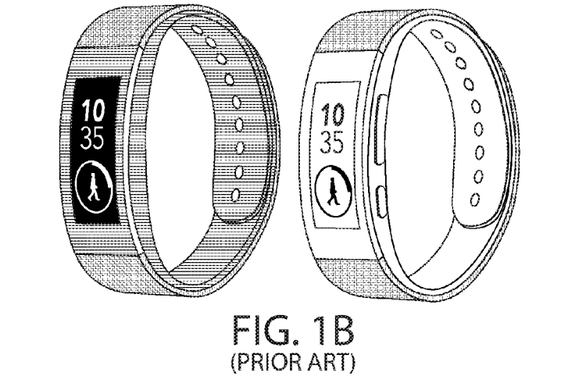
FIG. 1B shows a prior art wearable incorporating an electrophoretic display.

In recent years, hundreds of wearable electronic devices have entered the market, many of them incorporating a variety of sensors and communication devices, thus providing increased functionality beyond a simple digital wristwatch. While there is great demand for improved functionality in wearable devices, consumers also require that the devices are lightweight, energy efficient, and flexible. For these reasons, flexible electrophoretic image displays (EPIDs) have been highly regarded for incorporation into wearables. Flexible EPIDs are light, thin, power-thrifty, and have excellent visibility. It is no surprise that flexible EPIDs have been incorporated into a number of wristwatch-type wearable devices, such as shown in FIGS. 1A and 1B. In addition to wristwatch-type devices, larger devices having greater functionality and greater display areas have been proposed. See, FIG. 1C. Thus far, however, these larger devices are limited in their flexibility because portions of the device need to remain rigid to protect the sensitive circuitry.

Figure 1C:
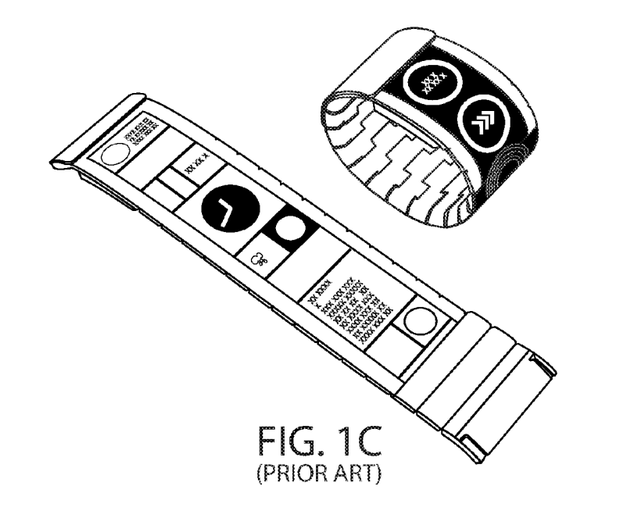
FIG. 1C shows a prior art wearable incorporating an electrophoretic display.

In existing wearable devices that use flexible EPIDs, the active area having a display function is typically on the order of a watch face, e.g., as shown in FIGS. 1A and 1B. When flexible EPIDs are incorporated in larger devices, e.g., as shown in FIG. 1C, the devices have required larger and heavier supporting structures to support the required circuitry. As a consequence, these devices do not achieve the full potential of wearable having a large area, flexible, EPID. Rather, their actual use is restricted to a limited display area, and the thickness and weight of the products make them bulky and uncomfortable to wear on a regular basis. Additionally, some amount of care is needed when removing the device to prevent damaging the flexible EPID, for example, by kinking the display.

SUMMARY OF INVENTION

The present invention has been created to achieve the full potential of flexible EPIDs when incorporated into a wearable device. That is, the disclosed invention maximizes the paper-like qualities of modern electrophoretic displays (lightness, thinness and flexibility).

The invention includes a flexible, wearable apparatus including a flexible electrophoretic display, a support member configured to be wound around a body part and to be held in place around the body part by an elastic force, and a retainer coupled to the support member and adapted to retain the flexible electrophoretic display so that the flexible electrophoretic display can translate freely through a void in a direction substantially perpendicular to a winding direction on the body part. In some embodiments, the retainer includes a transparent protective cover and a housing to couple the transparent protective cover to the support member. In some embodiments, the support member of the image displaying wearable apparatus is an elongated ribbon spring, which is caused to wind in a longitudinal direction by an elastic force, and that has a substantially elliptical section in a wound state.

In some embodiments, the support member of the image displaying wearable apparatus has a substantially planar area that has a reduced elastic force. This planar area is maintained in a substantially planar configuration even as the support member is moved between a wound and an unwound state. In some embodiments, the substantially planar area of the image displaying wearable apparatus has a plurality of small holes to reduce the elastic force. In some embodiments, the substantially planar area of the image displaying wearable apparatus has an opening to reduce the elastic force in the planar area.

In some embodiments, the elongated ribbon spring of the image displaying wearable apparatus is caused to have an arcuate shape in a cross-section perpendicular to a long axis of the support member, thereby causing the support member to exist in a substantially flat state against the elastic force for winding. In such embodiments, a support member may be transformed from the unwound state to the wound state by a stress of deformation on the arcuate shape of support member.

DETAILED DESCRIPTION

As indicated above, the present invention provides a flexible, wearable apparatus including a flexible electrophoretic display, a support member configured to be wound around a body part and to be held in place around the body part by an elastic force, and a retainer coupled to the support member and adapted to retain the flexible electrophoretic display so that the flexible electrophoretic display can translate freely through a void in a direction substantially perpendicular to a winding direction on the body part. Advanced embodiments of the invention include interactive capabilities, for example, a touch sensor or a touch screen, that allow a user to pull up information and messages, e.g., e-mail. Some flexible, wearable apparatus include a wireless receiver and a wireless transmitter so that the band can communicate with the internet, thereby allowing a user to pull up useful data such as weather or maps.

Because the flexible, wearable apparatus of the invention includes the above mentioned subject matter, the invention can provide a high functioning light weight, large area wearable display. Thus the invention has an appearance largely different from existing products, e.g., those shown in FIGS. 1A-1C. Furthermore, the number of components is significantly reduced compared to that of a wristwatch or a conventional wearable device, e.g., the iWatch® from Apple, thereby allowing a consumer to access the same functionality at a reduce cost. Adoption of a simple component structure also reduces the limitation on ID design, thus expanding the number of sizes and shapes that can be made using similar components. Additionally, the flexible, wearable apparatus may augmented with premium materials and finishes to create a premium product that will be both stylish and functional.

In some embodiments, the support member includes a ribbon spring that can transform between a substantially flat configuration and a substantially round configuration. In some embodiments the ribbon spring is incorporated into a housing that retains the flexible electrophoretic display. The housing may also include a protective cover. In some ribbon spring embodiments, a substantially flat state is maintained in the housing because the ribbon spring includes an arcuate cross-section that can be deformed to cause the ribbon spring to transform into a wound state. In such embodiments, the ribbon spring may be integrated to the retainer by bonding or the like. This configuration maintains the compliance during movement and the quality in a stop state, allows the apparatus to be attached to the body through a single action, maintains the minimum radius of the flexible display, allows the winding radius to be automatically adjusted in conformity with the dimensions of the part to be wound, negates need of the component configuration as with a belt of a conventional wristwatch, and can reduce the cost.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Films and sub-assemblies containing electro-optic materials; see for example U.S. Pat. Nos. 6,982,178; and 7,839,564;

(d) Backplanes, adhesive layers and other auxiliary layers and methods used in displays; see for example U.S. Pat. Nos. 7,116,318; and 7,535,624;

(e) Color formation and color adjustment; see for example U.S. Pat. No. 7,075,502; and U.S. Patent Application Publication No. 2007/0109219;

(f) Methods for driving displays; see for example U.S. Pat. Nos. 7,012,600; and 7,453,445;

(g) Applications of displays; see for example U.S. Pat. No. 7,312,784; and U.S. Patent Application Publication No. 2006/0279527; and (h) Non-electrophoretic displays, as described in U.S. Pat. Nos. 6,241,921; 6,950,220; and 7,420,549; and U.S. Patent Application Publication No. 2009/0046082.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface. Other types of electro-optic media may also be used in the displays of the present invention.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed, using a variety of methods, the display itself can be made inexpensively.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

Figure 2A:
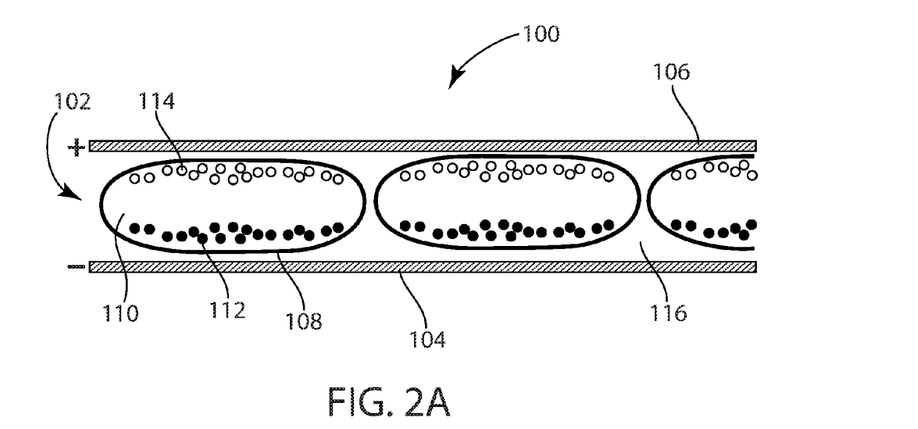
FIG. 2A illustrates an electrophoretic medium suitable for use in a flexible, wearable apparatus.

FIG. 2A is a highly schematic cross-section through a dual particle (e.g., black/white) encapsulated electrophoretic display (generally designated 100). This display 100 comprises an electrophoretic medium (generally designated 102) in the form of a thin film sandwiched between a pixel electrode 104 and a front plane electrode 106, the latter forming a viewing surface through which an observer views the display. The electrophoretic medium 100, itself, comprises a plurality of capsules each having a capsule wall 108 within which are retained a fluid 110, black electrophoretic particles 112 and white electrophoretic particles 114, the particles 112 and 114 bearing charges of opposite polarity. For the sake of illustration, it will be assumed below that the black particles 112 bear positive charges and the white particles 114 bear negative charges, although of course these charges could be reversed. The electrophoretic medium 100 further comprises a polymeric binder 116, which surrounds the capsules and forms them into a mechanically coherent layer. Those skilled in the technology of electrophoretic displays will be aware of numerous variations which can be made in the type of display shown in FIG. 2A; for example, the electrophoretic particles and the fluid may be retained in microcells rather than capsules and, when the display is to operate in a shutter mode, with one light-transmissive state and one substantially opaque state (FIG. 2B), the electrophoretic medium may contain only one type of electrophoretic particle in the fluid.

It will be apparent from FIG. 2A that when a voltage difference exists between the electrodes 104 and 106, the electric field to which the electrophoretic medium 102 is subjected is predominantly normal to the plane of this medium. Hence, the electrophoretic forces on the electrophoretic particles 112 and 114 caused by this electric field drive the electrophoretic particles perpendicular to the plane of the medium 102, towards or away from the front electrode 106. For example, as illustrated in FIG. 2A, if a positive potential is applied to the front electrode 106 and a negative potential to the pixel electrode 104, the negatively charged white particles 114 are driven adjacent the front electrode 106 and the positively charged black particles are driven adjacent the pixel electrode 104, so that an observer viewing the display through the front electrode 106 sees the white color of the particles 114. Reversing the potentials on the electrodes 104 and 106 interchanges the positions of the particles 112 and 114, so that the observer now sees the black particles 112. By controlled applications of potentials to the electrodes intermediate gray states can also be shown to the observer.

Figure 2B:
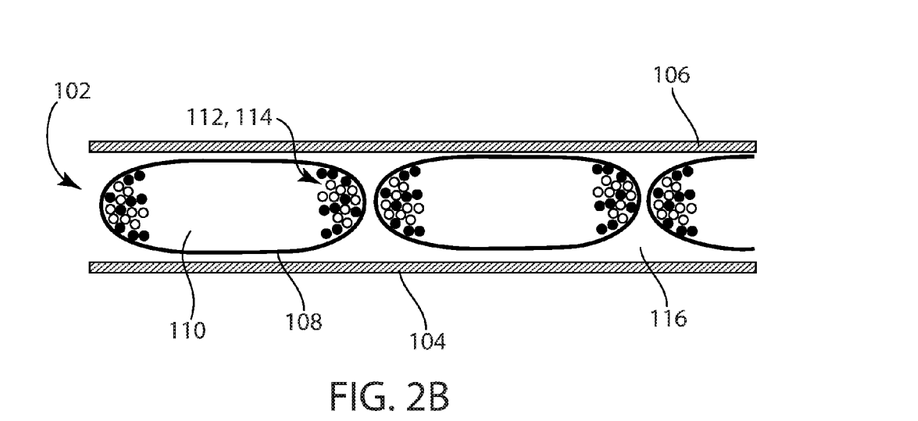
FIG. 2B illustrates an electrophoretic medium suitable for use in a flexible, wearable apparatus.

In addition to simple, first order, electrophoretic forces, the behavior of the pigment can be modified using second order electrophoretic interactions, such as electro-osmosis and/or dielectrophoresis. Harnessing these other forces offers new modes for controlling particle motion in an electrophoretic cell, as shown in FIG. 2B. By using specific time-dependent voltage waveforms, it is possible to drive the pigments into a substantially annular arrangement, whereby most of the incident light passes through the encapsulation layer, i.e., "SHUTTER OPEN" mode. This arrangement allows, for example, a back reflective surface below the electrophoretic layer to be viewed.

By comparing FIGS. 2A and 2B, it is clear that the encapsulated electrophoretic display construction is roughly identical regardless of the use of first or second (or higher) order driving. For example, the fluid and electrophoretic particles are contained within capsules held within an external polymeric binder. Nonetheless, it may be beneficial to alter the composition of the particles, fluid and polymeric binder and/or capsule wall, to encourage the particles to be attracted toward or away from side walls of the capsules when the appropriate waveform is applied. For example, if the electrophoretic particles are more polarizable than the fluid, owing to the particles having a larger dielectric constant or a larger electrical conductivity than that of the fluid, and if the external components (capsule wall and/or binder) are also more polarizable than the fluid, then the second-order forces will drive the particles toward the side walls of the capsules, where the vertical thickness of the capsules is less than in the middle of the capsule and the electric field magnitude is larger. The particle configuration resulting from second-order forces alone is illustrated in FIG. 2B, which shows the result of applying suitable time-dependent waveforms to the encapsulated display shown in FIG. 2A.

In some embodiments, such as described in U.S. Pat. No. 6,704,133, electrophoretic displays may be constructed with two continuous electrodes and an electrophoretic layer and a photoconductive layer between the electrodes. Because the photoconductive material changes resistivity with the absorption of photons, incident light can be used to alter the state of the electrophoretic medium. In some embodiments, the devices of U.S. Pat. No. 6,704,133 incorporated special barrier layers between the front electrode and the photoconductive material to reduce "dark currents" caused by incident light from the front of the display that leaks past the reflective electro-optic media.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Many types of electro-optic media are essentially monochrome, in the sense that any given medium has two extreme optical states and a range of gray levels lying between the two extreme optical states. However, there is today an increasing demand for full color displays, even for small, portable displays; for example, most displays on cellular telephones are today full color. To provide a full color display using monochrome media, it is either necessary to place a color filter array where the display can be viewed through the color filter array, or to place areas of different electro-optic media capable of displaying different colors adjacent one another.

The position of the color filter array (CFA) relative to the electro-optic medium in the optical stack can vary widely, but must take into account the type of electro-optic medium used and, in some cases, the properties of other layers of the optical stack. Color displays using CFA's can be broadly divided into two classes, namely front CFA displays (in which the CFA lies between the electro-optic medium and the viewing surface through which an observer views the display) and rear CFA displays (in which the CFA lies on the opposed side of the electro-optic medium from the viewing surface). If the electro-optic medium used is transmissive (i.e., light, typically from a backlight, passes through the electro-optic medium, which acts as a light valve controlling the amount of light which passes through each pixel, and then emerges from the viewing surface), the CFA can occupy any position in the optical stack, since regardless of the position of the CFA, light will pass through both the CFA and the electro-optic medium. Thus, both front and rear CFAs can be used with transmissive electro-optic media, although the former are probably more common.

In some instances, an electro-optic display is constructed with the CFA beneath the electro-optic medium. In a rear CFA electro-optic display, the CFA may be disposed between the electro-optic layer and the rear electrodes, or may be disposed on the opposed side of the rear electrodes from the electro-optic layer, but the former location is generally preferred because it reduces the distance between the electro-optic layer and the CFA (thus reducing parallax between the two layers and possible color distortions caused by light leaving the display at a substantial angle to the normal), and because it simplifies display construction; since production of color requires reflection of light from either the CFA or a layer disposed behind the CFA, it is convenient to use a light-transmissive CFA and rely upon reflective rear electrodes to effect the necessary light reflection, rather than having to provide light-transmissive rear electrodes to enable light to reach a CFA disposed behind the rear electrodes, and then either make the CFA itself reflective or provide a separate reflector behind the CFA. U.S. Patent Publication 2014/0362131 describes a rear CFA electro-optic display in which the electro-optic medium is capable of two opaque states and a light-transmissive state. The color saturation of the resulting display may be improved by incorporating fluorescent or phosphorescent materials into the rear color filter array.

Figure 3A:
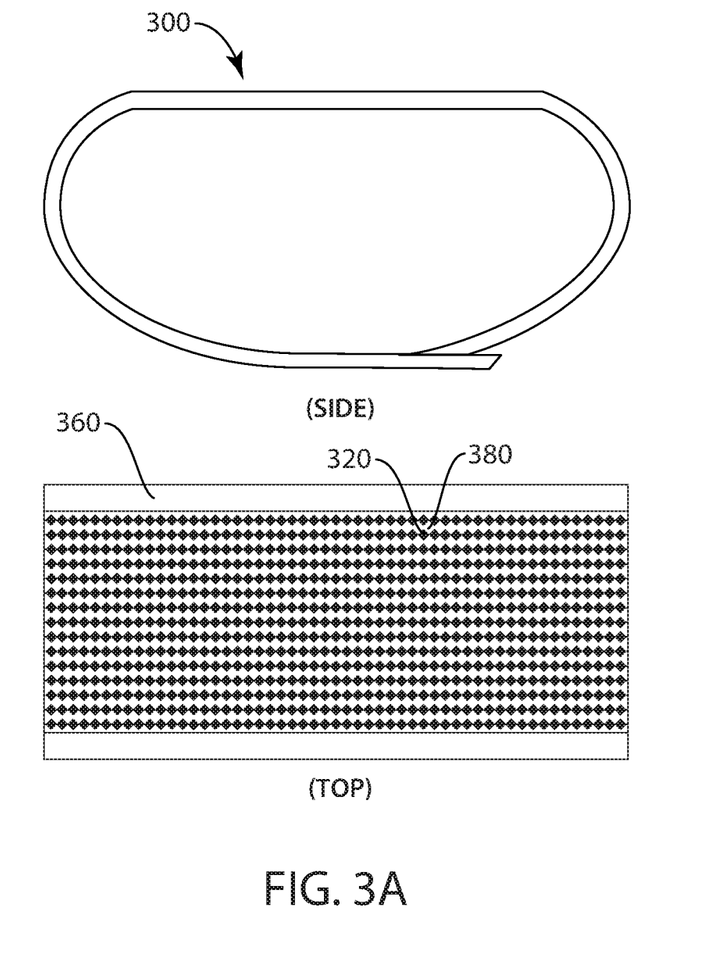
FIG. 3A illustrates a side and top view of an example of a flexible, wearable apparatus of an embodiment of the present application.

A flexible, wearable apparatus 300 is shown in FIG. 3A, and is described below. The flexible, wearable apparatus 300 comprises an electrophoretic display 320 of any type discussed above, and control electronics (not shown) as needed to switch the electrophoretic display.

As shown in FIG. 3A, a flexible, wearable apparatus 300 of this embodiment has a structure such that its section can be substantially elliptical and the radius can be adjusted to be wound around a body part with an appropriate stiffness in conformity with the dimensions of the body part. The upper part of the sectional view is substantially planar. For example, in the case of being wound around a wrist, the substantially planar part is arranged on the same plane as the back of a hand so as to allow an end user to easily view the display part as with a dial plate of a traditional wristwatch. The flexible, wearable apparatus of this embodiment includes a flexible electrophoretic display disposed not only on the substantially planar part but also substantially over most of the length of the apparatus. Consequently, important information can be displayed on the substantially planar part while the other information is displayed on the parts other than the substantially planar part, for convenience of the end user. In order to view the images not in the substantially planar portion, a user need only roll his/her wrist to change the angle.

(Configuration of Flexible, Wearable Apparatus)

Figure 3B:
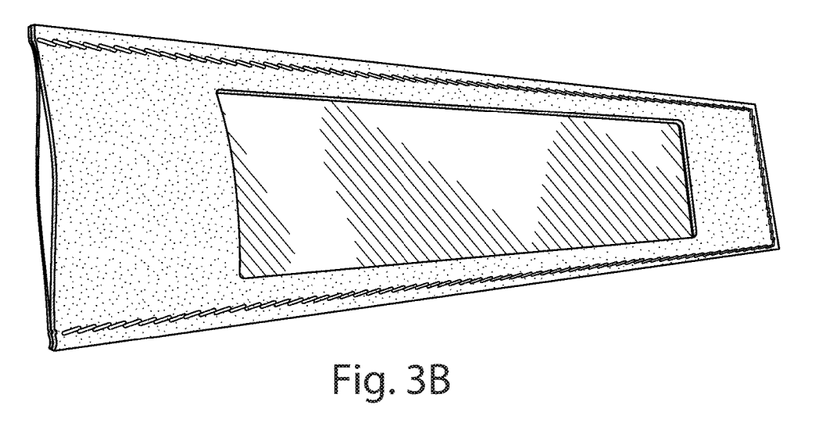
FIG. 3B is a photograph of an embodiment of a flexible, wearable apparatus of the invention.
Figure 3C:
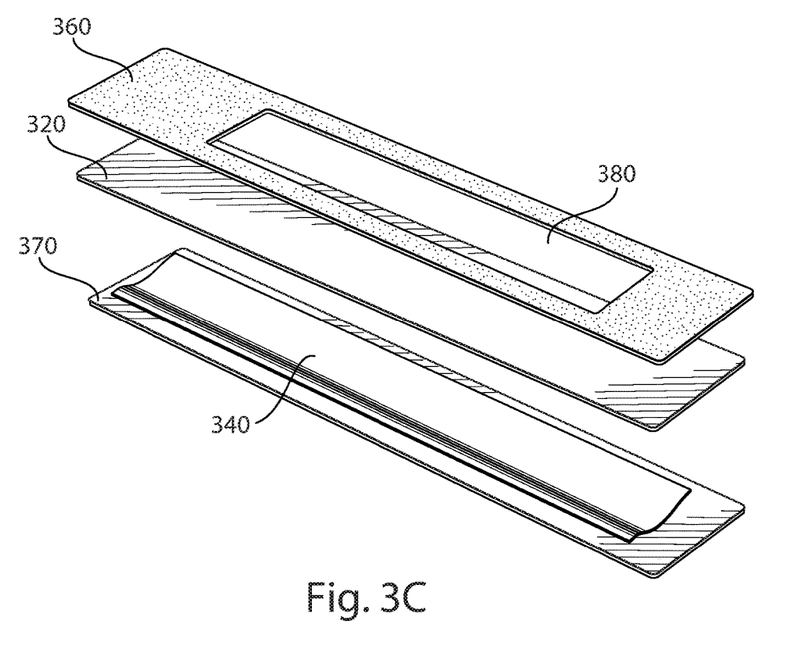
FIG. 3C shows an exemplary configuration of a flexible, wearable apparatus of the invention.

Referring to FIG. 3C, the configuration of the flexible, wearable apparatus of this embodiment will be described. As illustrated in FIG. 3C, the flexible, wearable apparatus of this embodiment has an appearance with a shape shown in FIG. 3B. As to the configuration, a flexible electrophoretic display 320 is supported by a support member 340, e.g., a flat spring or a ribbon spring, and a bottom 370 of a housing made of leather or the like, and retained by a top 360 of a housing made of leather or the like, and a flexible transmissive protective film 380 serving as a protective cover which can protect the electrophoretic display 320 from mechanical damage and environmental damage, such as water or sweat. Importantly, the top 360 and bottom 370 of the housing act as a retainer and create a void through which the electrophoretic display 320 can move as the apparatus is bent, e.g., to fit about a wrist. As shown in FIG. 3C, the bottom surface of the flexible electrophoretic display 320 is supported by the ribbon spring 340, and both the elements are retained by the housing made of leather or the like so as to be sandwiched between the packages. In some embodiments, the bottom 370 and the ribbon spring 340 are fixed to each other with bonding or the like. The top 360 of the housing has an opening serving as the primary display area through which the flexible electrophoretic display 320 is viewed. In some embodiments, the transmissive protective film is fixed to the top 360 of the housing with bonding or the like. The design is not limited to FIG. 3C, however. In other embodiments, the transmissive protective film 380 may be affixed to the upper side of the flexible electrophoretic display 320, thereby allowing both elements to move relative to the top 360 of the housing. The top 360 and the bottom 370 of the housing can be integrated by bonding, joining, sewing or the like. Because the top 360 and the bottom 370 of the housing are integrated by bonding, joining, sewing or the like, the flexible electrophoretic display 320 disposed between the top 360 and the bottom 370 of the housing is clamped with a certain pressure. The flexible electrophoretic display 320 is thus held firmly, but slidably, between the top 360 of the housing and the transmissive protective film 380, and the support member 340. As described herein, the top 360 of the housing and the transmissive protective film 380 protect the electrophoretic display 320 and the support member, as well as additional wires, circuits, controllers, batteries, receivers, transmitters, etc. The top 360 and the bottom 370 of the housing may also provide aesthetic benefits, including color and texture, as well as comfort and environmental benefits. For example, the top 360 and the bottom 370 of the housing may be constructed from leather, which is attractive and more pleasant to be worn against the skin than having direct contact with the support member 340, e.g., a ribbon spring. While the flexible, wearable apparatus 300 is primarily described with a housing, it is to be understood that any retainer may be substituted provided that the retainer was adapted to allow the electrophoretic display to move through a void as the structural element is transformed. For example, the retainer could also be a series of clips, a molded resilient material or a semi-rigid flexible channel having an "L" shape.

Figure 3D:
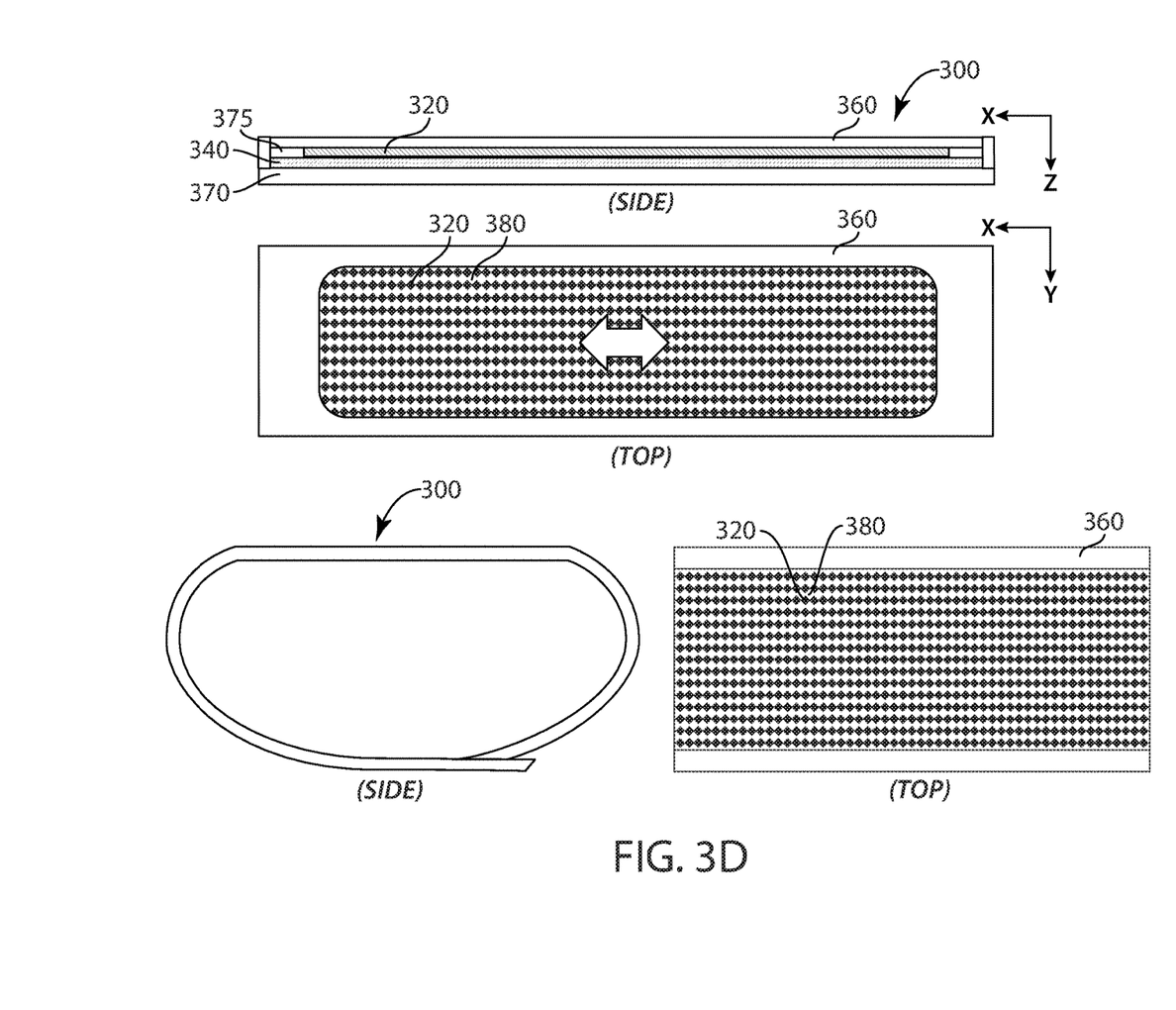
FIG. 3D illustrates a side and top view of a rounded state and straight state of a flexible, wearable apparatus of the invention.

In some embodiments, the flexible electrophoretic display 320 is not bonded or fixed with respect to the support member 340, the top 360 of the housing, or the transmissive protective film 380. In such configurations, the flexible electrophoretic display 320 may be coupled to the support member 340, however, the flexible electrophoretic display 320 is not fixed to the transmissive protective film 380 nor top 360 of the housing. Consequently, this configuration allows the flexible electrophoretic display 320 to translate in a direction substantially perpendicular to the winding direction. As shown in FIG. 3D, when the apparatus 300 is defected in the z direction, the flexible electrophoretic display 320 can move in the x direction within the void 375 created by the joining of the top 360 and bottom 370 of the housing. According to such a configuration, even if the state is abruptly changed, i.e., when the flexible, wearable apparatus 300 is rapidly worn or if removal is frequently repeated, the flexible electrophoretic display 320 can freely move because it is captured within the housing. Because of this design, the flexible electrophoretic display 320 can bend with a radius of curvature substantially larger than the minimum radius of curvature assumed in specifications, and the display 320 can move back and forth as the apparatus is bent. The design greatly reduces the possibility of breaking the flexible electrophoretic display 320. Alternative embodiments of the invention may also include stops (not shown in FIGS.) to prevent the support member 340 from being wound into a radius that risks damaging the flexible electrophoretic display 320.

As illustrated in FIG. 3D, the support member 340 of this embodiment can be formed to have two states by bending the support member 340 in the z direction. The support member 340 is easily transformed from a first flat state to a second rounded state using only hand strength. That is to say, a user can simply flex the flexible, wearable apparatus 300 between the state shown at the upper part in FIG. 3D and the state shown at the lower part in FIG. 3D using only the fingers on both hands. The support member 340 may alternatively be constructed from a variety of materials that provide mechanical stability and allow a user to easily transform the flexible, wearable apparatus 300 between first (flat) and second (rounded) states. For example, thin, resilient aluminum, nitinol, or a shape-memory polymer that remembers its state (such as polyethylene terephthalate (PET) and polyethylene oxide (PEO) block copolymers containing polystyrene and poly(1,4-butadiene)) can be used. A flexible, wearable apparatus 300 including a ribbon spring 340 will assume a rounded state (the lower part of FIG. 3D) around an object (e.g., a wrist) if the flexible, wearable apparatus 300, in the straight state, is presented to the object.

In some embodiments, additional elements may be incorporated into the apparatus, such as a back sheet (not shown) between the flexible electrophoretic display 320 and the support member 340. In this configuration, the flexible electrophoretic display 320 is retained by the transmissive protective film 380 and the upper package 360. Alternatively, even without the transmissive protective film 380, the flexible electrophoretic display 320 can be retained only by the upper package 360.

The electrophoretic display 320 shown in FIGS. 3A-3D is shown as a single flexible electrophoretic display. Such flexible electrophoretic displays are described in the above-mentioned patent applications and will include a flexible active matrix backplane, for example, available from Plastic Logic, Dresden, Germany. In other embodiments, the electrophoretic display will include a plurality of semi-rigid electrophoretic displays that are based upon smaller, rigid, active-matrix backplanes. The plurality of semi-rigid electrophoretic displays may be coupled together with additional mechanical components, such as hinges. The plurality of semi-rigid electrophoretic displays may use a coordinated image driver to produce images that appear to span the entire flexible, wearable apparatus 300. In some instances the single flexible display or the plurality of electrophoretic displays will cover the entire surface area of the top 360. In other instances, the electrophoretic display 320 will cover greater than 70% of the top 360, e.g., greater than 80% of the top 360, greater than 90% of the top 360. The electrophoretic display 320 may additionally incorporate elements such as a touch screen (not shown in FIGS.)

Because the display uses low-power electrophoretic displays 320, the flexible, wearable apparatus 300 is easily powered with a rechargeable battery. Because the displays are low power, the flexible, wearable apparatus 300 will need to be recharged at least about once a year, or at least about once a month, or at least about once a week. Additionally, because of the bistable nature of the electrophoretic display 320, it will be capable of showing an image even when no power is supplied to the electrophoretic display 320. This is an especially desirable property when the flexible, wearable apparatus is used as a decorative bracelet or a headband. Because of the low power consumption, a variety of sources can be used to supply the needed power. In addition to rechargeable batteries, flexible, wearable apparatus 300 can also be constructed with induction coils to allow for inductive-coupling recharging. Alternatively, the flexible, wearable apparatus 300 can include a photovoltaic cell that will charge a battery while the flexible, wearable apparatus is exposed to light.

(Structural Members that Maintain Substantially Planar Area)

Figure 4A:
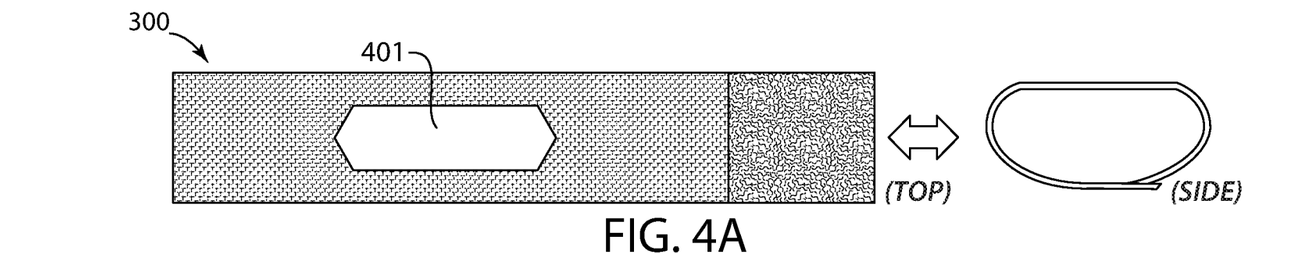
FIG. 4A illustrates an embodiment of a support member constructed to provide a substantially planar viewing surface.
Figure 4B:
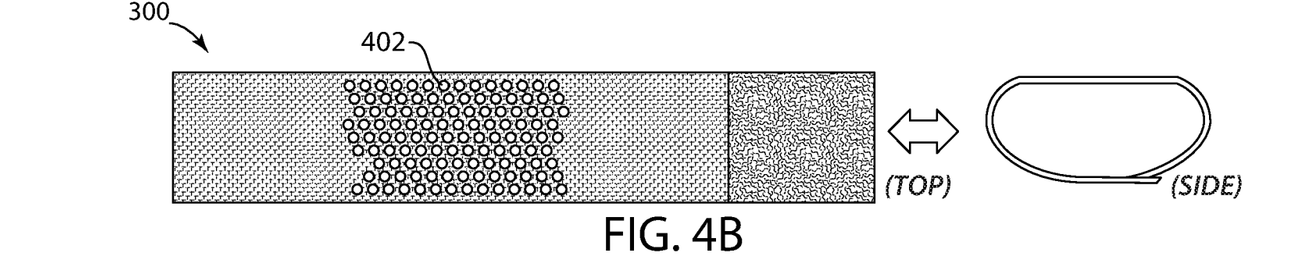
FIG. 4B illustrates an embodiment of a support member constructed to provide a substantially planar viewing surface.
Figure 4C:
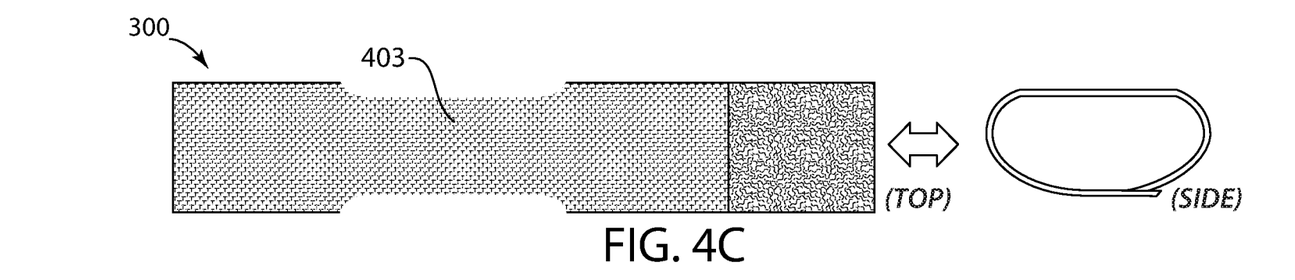
FIG. 4C illustrates an embodiment of a support member constructed to provide a substantially planar viewing surface.

An area configured to be substantially planar is provided around the center of the support member in the longitudinal direction of the flexible, wearable apparatus of this embodiment, which is suitable for a display to frequently change displayed content and to display important information and so as to improve viewability. Referring to FIGS. 4A to 4C, when the flexible, wearable apparatus of this embodiment is wound around a wrist, the band could be bent with the same extent of curvature over the entire band in the case where such a substantially planar area was not formed. The image to be displayed on the flexible electrophoretic display is thus displayed over the entire curved surface. In general, an image displayed on a curved surface looks distorted more or less from an end user. The distortion reduces the viewability, and prevents the image from being correctly read. The main display area is preferably planar to improve the viewability and allow the display to be correctly identified.

For example, because a conventional wristwatch allows a small circular or rectangular, flat display part to be fixed to a wrist with a band, a good viewability can be achieved. However, in the case of a wristband type flexible, wearable apparatus having a circular or an elliptical section as in this embodiment, the band has a curved surface over the entire length, which prevents a planar part to be provided in the conventional art. Specifically, in the case of the flexible, wearable apparatus of this embodiment, it is wound around a wrist using the single ribbon spring having the same extent of elastic force over the entire length and then cannot be partially even substantially planar. Without a complex configuration where another material is further combined or a hinge structure is adopted, a substantially planar area cannot be partially provided while allowing the band to be fitted to the body, such as a wrist. In this embodiment, by applying a simple process (cutting out or punching out) to a certain area of a ribbon spring, the elastic force can partially be reduced at the area and then the substantially planar area is formed.

As described above, the substantially planar area is formed by applying the simple process to desired parts on the ribbon spring to reduce the elastic forces only at the parts and increase the curvatures compared to the other parts. Referring to FIGS. 4A to 4C, in substantially planar areas 401 to 403, application of a certain process to parts where substantially planar surfaces are intended to be formed reduces elastic forces (winding forces) at the respective parts. The areas with the reduced elastic forces are not completely planar, but have a larger curvature in the case of being worn than the other areas in the ribbon spring. As a result, the areas become substantially planar areas. As illustrated in FIG. 4A, the substantially planar area 401 is cut out and intends to have a certain opening, which reduces the elastic force. Likewise, the substantially planar area 402 is punched out and intends to have multiple small holes formed therein, which reduces the elastic force. The substantially planar area 403 causes the elongated ribbon spring to have an arc shape in a short-side section by cutting out to keep a flat state against the elastic force for winding. Such cut-out or punch-out features are not visible in the final flexible, wearable apparatus 300 because they are hidden by the electrophoretic display 320. The portion of the apparatus comprising the substantially planar area may vary depending upon the end application. In some embodiments, the substantially planar area having a reduced elastic force is less than 50% of the total area of the support member as illustrated in FIGS. 4A-4C without damaging fitness of the flexible, wearable apparatus. In some embodiments, the substantially planar area having a reduced elastic force will be between 50% of the total area and 20% of the total area.

Figure 5:
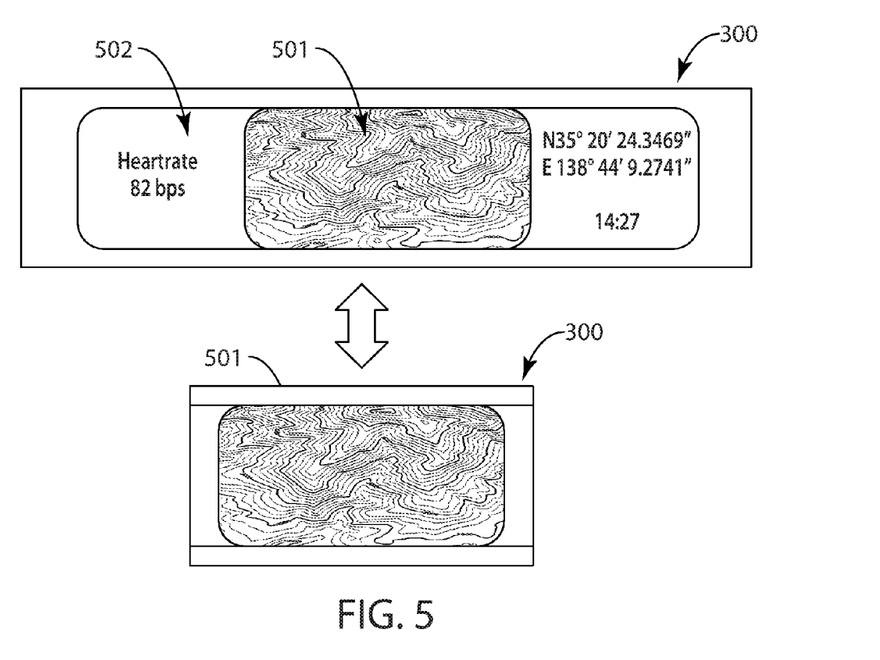
FIG. 5 illustrates the functionality of an embodiment of a flexible, wearable apparatus of the invention.

The flexible, wearable devices of the invention will have a variety of uses. In FIG. 5, a flexible, wearable apparatus 300 is used to track a user's location on a map during a hike and to provide the hiker's vitals. As shown in FIG. 5, the display may show all pertinent information, such as heartrate, location, and time in addition to a topographic map when extended (upper part of FIG. 5). The flexible, wearable apparatus can be wrapped around the wrist (lower part of FIG. 5) showing the map so that it can be constantly referenced as the hiker traverses the trail. In this state, by shifting line of sight, an end user can confirm pertinent information, such as heartrate, location, and time. Namely, a map 501, which is important information, is displayed on the substantially planar part (it is a matter of course that although not illustrated, the own position can be displayed on the map through GPS and the like or the current position can be always displayed at the center of the map) while a heart rate 502 and time, which are supplementary information and easily readable information, are displayed in other areas that are not substantially planar. Consequently, all display areas are advantageously used.

In this embodiment, the substantially planar area is provided around a substantially center position of the flexible, wearable apparatus. The arrangement is not limited to this example. This area can be provided by applying an analogous process to any site.

Figure 6:
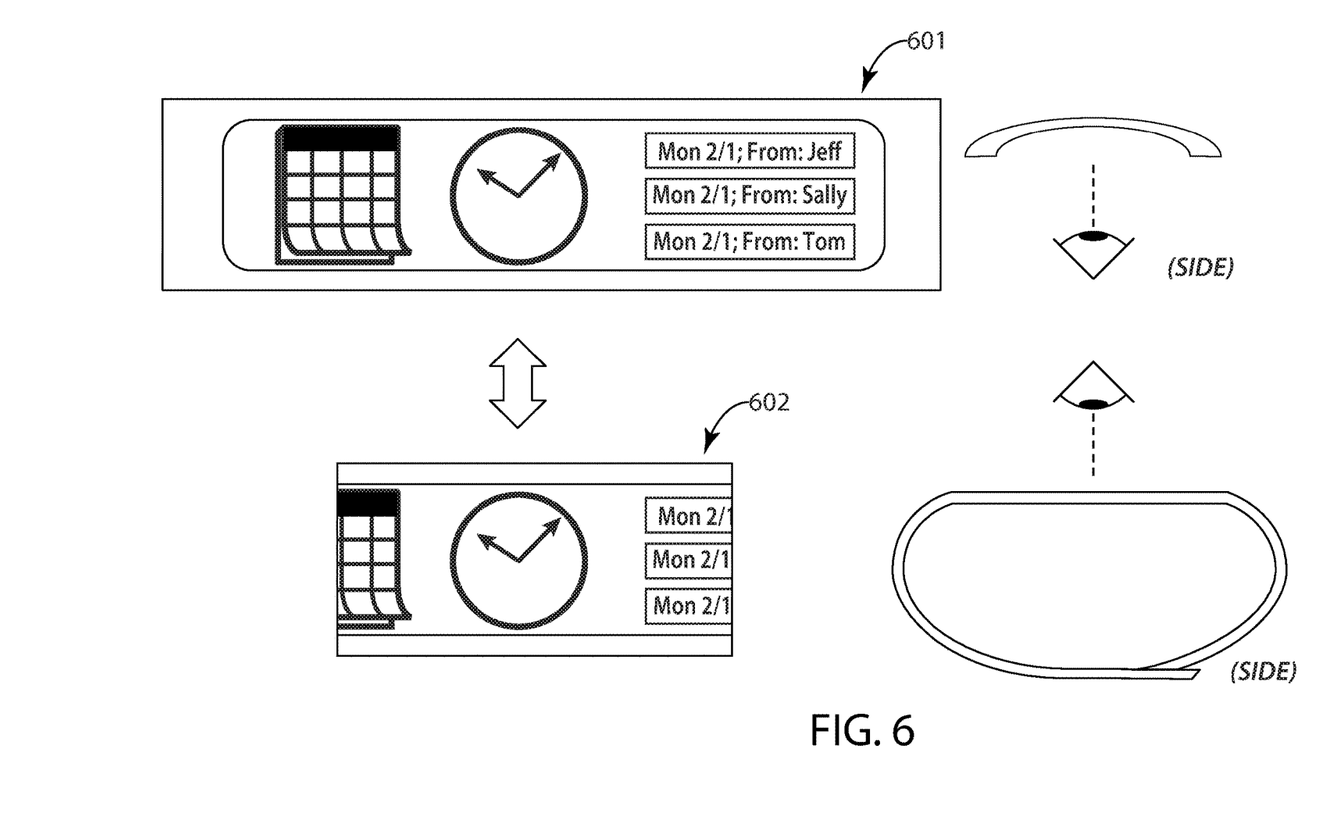
FIG. 6 illustrates the functionality of another embodiment of a flexible, wearable apparatus of the invention . . . .

In some embodiments, the flexible, wearable apparatus can be shaped into a flat state that will allow the flexible, wearable apparatus to formed as a small display that will stand-alone, for example on a night stand, shelf, or desk. Namely, use of the two state ribbon spring as described above allows the apparatus itself to be placed in a vertical orientation or in a horizontal orientation and used as a display apparatus that is landscape-oriented and relatively large in the flat stable state 601, and also allows the apparatus to be wound around a wrist and used as an alternative item replacing a watch in the rounded state 602, as illustrated in FIG. 6. The flexible, wearable apparatus of FIG. 6 may also include a front-light to allow it to be viewed in low-light situations without separate illumination.

While the embodiment of a flexible, wearable apparatus 300 shown above will stay around, for example, a wrist without additional coupling, a coupling element may be included to minimize the change that the flexible, wearable apparatus will inadvertently leave, for example, the wrist. The coupling element may be a mechanical fastener such as a snap or a hasp. Other types of coupling, such as magnetic coupling, may also be used. Magnetic coupling may also provide electronic or magnetic confirmation that the flexible, wearable apparatus 300 is in the rounded state. This confirmation could be the basis for an on/off switch that would only enable the electrophoretic display 320 when the flexible, wearable apparatus 300 was in a rounded state. Alternatively, such a sensor may be used to regulate the WIFI capabilities of a flexible, wearable apparatus. For example, the WIFI receiver may only be enabled when the flexible, wearable apparatus 300 was in the rounded state.

Figure 7A:
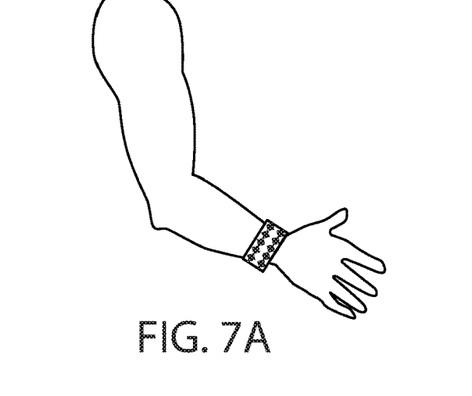
FIG. 7A illustrates an embodiment of a flexible, wearable apparatus adapted for wearing about the wrist.
Figure 7B:
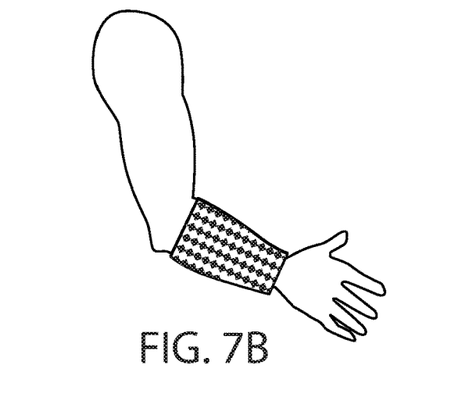
FIG. 7B illustrates an embodiment of a flexible, wearable apparatus adapted for wearing about the forearm.
Figure 7C:
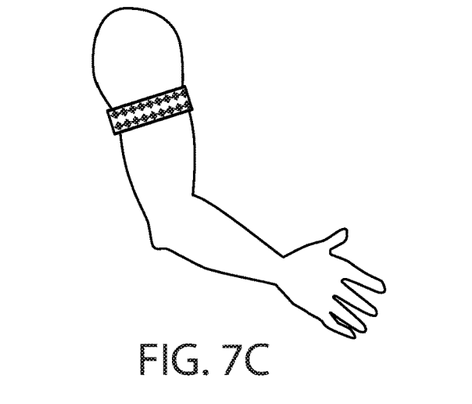
FIG. 7C illustrates an embodiment of a flexible, wearable apparatus adapted for wearing about the bicep.

The flexible, wearable apparatus described herein will lend themselves to a number of applications, such as shown in FIGS. 7A, 7B, and 7C. In one embodiment, a flexible, wearable apparatus 300 can be worn around a wrist, similar to a watch, as shown in FIG. 7A. Such a flexible, wearable apparatus can serve the dual purpose of being decorative and providing information, such as the time, and alerts from messages, e-mail, etc. A larger flexible, wearable apparatus 300 may encompass the entire forearm, as shown in FIG. 7B. This larger format may be useful for providing information that is better viewed in a larger format, such as building floorplans, electronic messages, eating menus, photographs, etc. Of course, the flexible, wearable apparatus can be used on any part of the body where they would be useful, for example on the bicep (FIG. 7C), in addition to any other place where it could be useful to have an electrophoretic display wrap around an object. For example, a flexible, wearable apparatus 300 could be wrapped around a light post, bicycle tube, tree, fence post, etc.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A flexible, wearable apparatus, comprising:
   a flexible electrophoretic display;
   a support member configured to be wound around a body part and to be held in place around the body part by an elastic force; and
   a retainer coupled to the support member and adapted to retain the flexible electrophoretic display so that the flexible electrophoretic display can translate freely through a void in a direction substantially perpendicular to a winding direction on the body part.

2. The flexible, wearable apparatus according to claim 1, wherein the retainer comprises a transparent protective cover configured to allow a user to view a portion of the flexible electrophoretic display.

3. The flexible, wearable apparatus according to claim 2, wherein the retainer further comprises a housing for coupling the protective cover to the support member.

4. The flexible, wearable apparatus according to claim 3, wherein the housing comprises leather, cloth, or a polymer.

5. The flexible, wearable apparatus according to claim 2, wherein greater than 70% of the active area of the flexible electrophoretic display is viewable through the transparent protective cover.

6. The flexible, wearable apparatus according to claim 1, wherein the support member comprises an elongated ribbon spring that is wound in a longitudinal direction by an elastic force and wherein the support member has a substantially elliptical cross-section in a wound state.

7. The flexible, wearable apparatus according to claim 6, wherein the support member comprises a substantially planar area having a reduced elastic force, the substantially planar area being maintained in a substantially planar condition in the wound state.

8. The flexible, wearable apparatus according to claim 7, wherein the substantially planar area having a reduced elastic force comprises less than 50% of the total area of the support member.

9. The flexible, wearable apparatus according to claim 7, wherein the substantially planar area has a plurality of small holes to reduce the elastic force.

10. The flexible, wearable apparatus according to claim 7, wherein the substantially planar area has an opening to reduce the elastic force.

11. The flexible, wearable apparatus according to claim 6, wherein the elongated ribbon spring has an arcuate cross-section perpendicular to the longitudinal direction of the ribbon spring.

12. The flexible, wearable apparatus according to claim 11, wherein the elongated ribbon spring transforms via elastic force from a substantially flat shape to the wound state when a stress of deformation on the arcuate cross-section is attenuated.

13. The flexible, wearable apparatus of claim 1, wherein the electrophoretic display comprises an active matrix of transistors.

14. The flexible, wearable apparatus of claim 1, wherein the flexible electrophoretic display is active when the wearable apparatus is in a wound state, but not active when the wearable apparatus is in an unwound state.

15. The flexible, wearable apparatus of claim 1, further comprising coupling elements in proximity to first and second ends of the wearable apparatus wherein, when the coupling elements are in proximity to each other, the flexible display is activated.

16. The flexible, wearable apparatus of claim 1, further comprising a controller adapted to provide a signal to the flexible electrophoretic display to cause the flexible electrophoretic display to switch between an active state and an inactive state.

17. The flexible, wearable apparatus of claim 1, further comprising a touch sensor.

18. The flexible, wearable apparatus of claim 17, wherein the flexible electrophoretic display comprises the touch sensor.

19. The flexible, wearable apparatus of claim 1, wherein the support member comprises spring steel, nitinol, or a shape-memory polymer.

20. The flexible, wearable apparatus of claim 1, wherein the body part is a wrist, arm, head, leg, ankle, finger, neck, or ear.

* * * * *